Nov. 27, 1945.  W. A. LIPPINCOTT  2,389,792
ACCUMULATOR
Filed Oct. 25, 1943  2 Sheets-Sheet 2

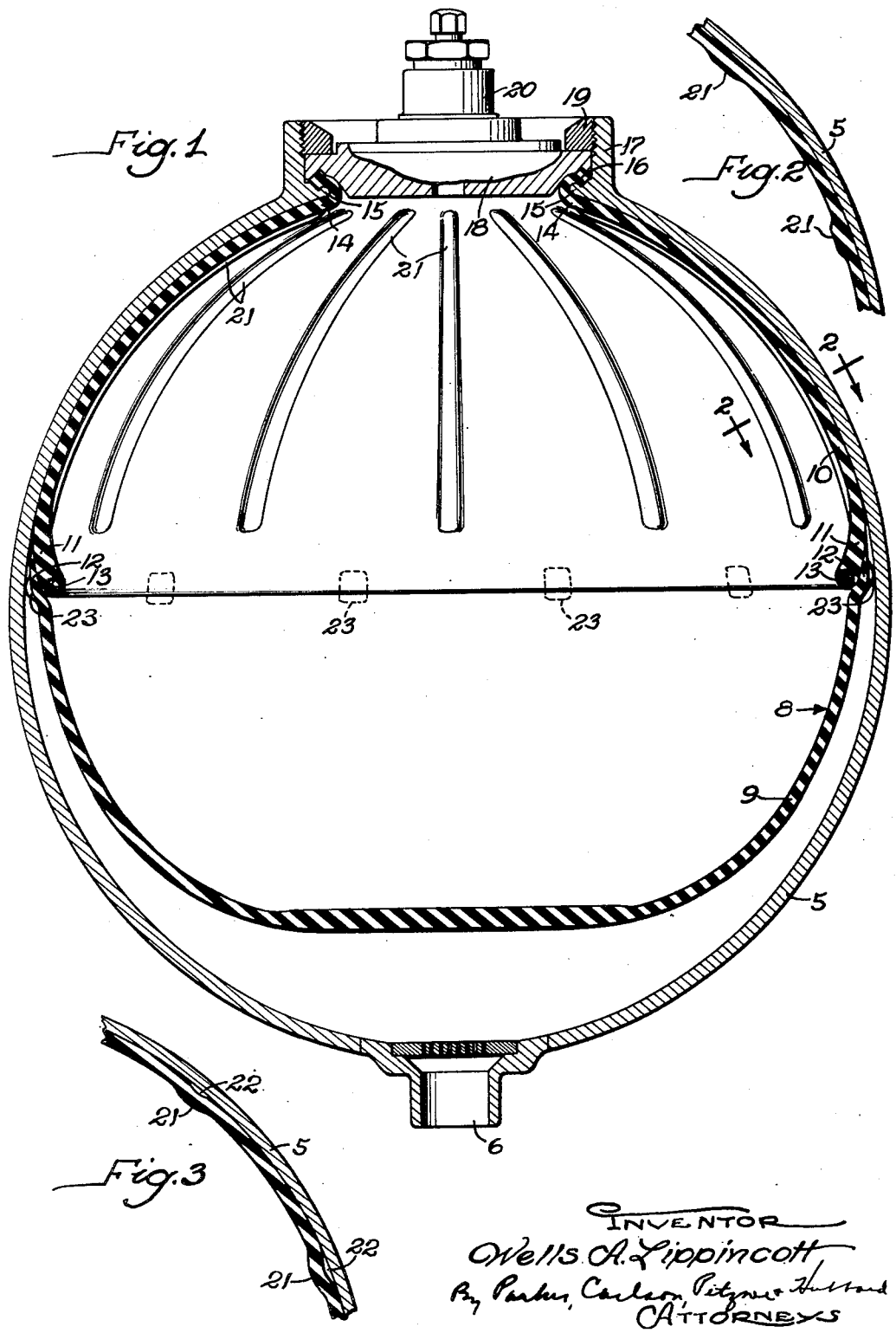

INVENTOR
Wells A. Lippincott
By Parker, Carlson, Pitzner & Hubbard
ATTORNEYS

Patented Nov. 27, 1945

2,389,792

UNITED STATES PATENT OFFICE 2,389,792

ACCUMULATOR

Wells A. Lippincott, Evanston, Ill., assignor to Ideal Roller & Manufacturing Company, Chicago, Ill., a corporation of Illinois Application October 25, 1943, Serial No. 507,573

5 Claims. (Cl. 138—30)

This invention relates to hydraulic accumulators in which a bladder or diaphragm of synthetic rubber or the like is used to separate bodies of liquid and compressed air within a tank.

The invention aims to achieve high volumetric efficiency in such an accumulator by providing a novel means for insuring the escape during expansion of the bladder of any liquid that may become trapped between the bladder and the tank wall.

The invention also resides in the novel structural character of the means for accomplishing the foregoing object.

Other objects and advantages of the invention will become apparent from the following detailed description taken in connection with the accompanying drawings, in which Figure 1 is a transverse sectional view of an accumulator embodying the novel features of the present invention.

Figs. 2 and 3 are fragmentary cross-section views taken along the line 2—2 of Fig. 1 under different operating conditions.

Figure 4:
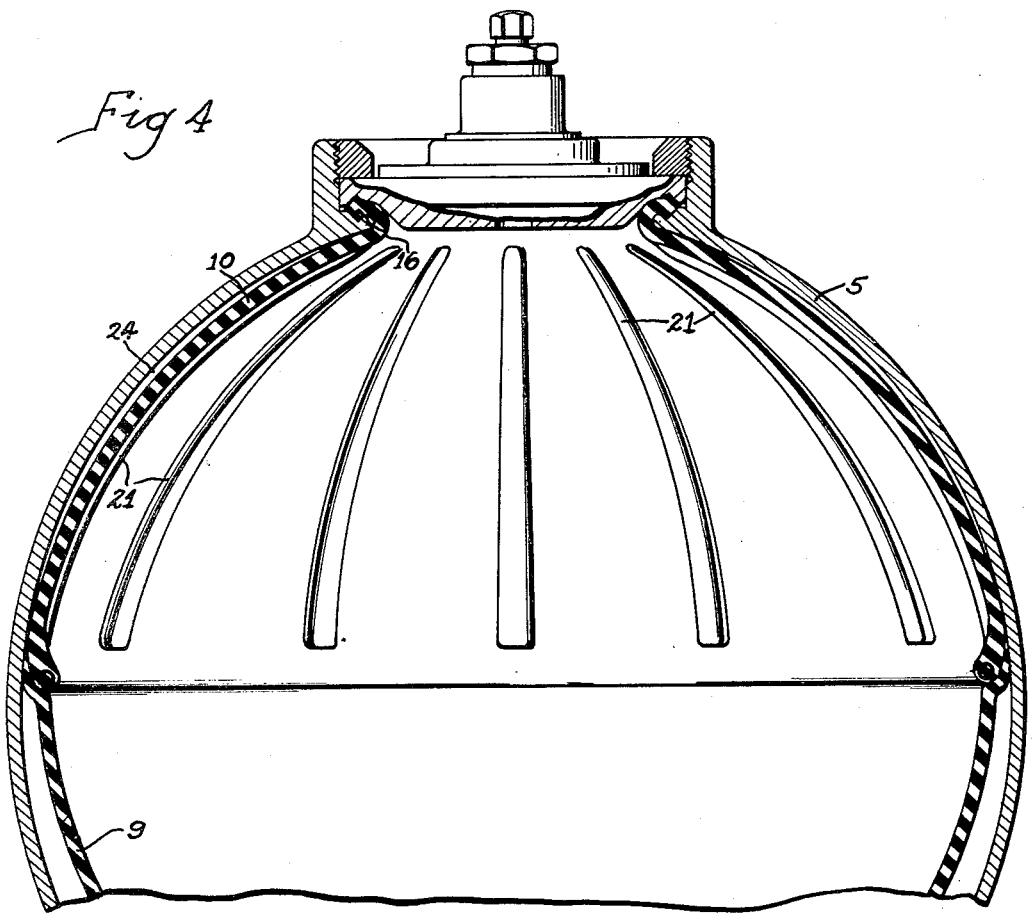
Fig. 4 is a view like Fig. 1 showing a different operating condition.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawings the invention is shown embodied in an accumulator comprising a rigid spherical tank 5 formed at one end with a flanged opening 6 constituting a fluid inlet and outlet and at the other end with a flange 7 defining an opening through which a flexible bladder or diaphragm 8 may be inserted. In this instance, the bag comprises two hemispherical cups 9 and 10 molded of resiliently yieldable material such as synthetic rubber which remains relatively flexible at low temperatures. The cup 9, which flexes into and out of the cup 10 as liquid flows into and out of the opening 6 is made somewhat more flexible than the cup 10, and, in the construction shown in Fig. 1, the latter is shaped to fit closely within one end of the tank. Preferably, the cup 10 is somewhat shallower than a true hemisphere, and its lip 11 is overlapped by the feathered lip 12 of the cup 9 which latter lip tapers to a feather edge and is adhesively secured around the lip 11. If desired, a resilient extensible and contractible element such as a coiled spring wire 13 may be molded into the lip 11 to insure expansion of the latter against the tank automatically following insertion of the bladder through the flange 7.

The cup 10 may be secured directly to a valve stem and thereby supported within the tank. Or, as in the present instance, it may have an opening defined by a neck 14 which may be clamped around the tank opening in any suitable way. Herein, the neck is turned outwardly around a bead 15 which provides a shoulder against which a flange 16 on the neck is clamped by a cover 18, the clamping pressure being applied by a ring 19 threading into the flange 7. The bladder is inflated by air introduced through a valve stem 20 on the cover.

Bladders of the above character stretch both radially and longitudinally of the cup axis when inflated. If as shown in Fig. 1, the cup 10 is molded to fit the interior of the tank, the stretching of this cup will be only longitudinal as the bladder expands fully within the tank. As an incident to this, the lip 11 will shift toward or beyond the tank center. On the other hand, the cup 10 may not be formed to fit accurately within the tank end. In such a case, part of the cup may be separated from the internal surface of the tank leaving, for example, a space 24 as shown in Fig. 4. An an incident to full expansion of such a bladder, the cup 10 is expanded radially.

In either of the instances referred to above, the wall of the cup 10 is tensioned or extended in an edgewise direction. Advantage is taken of such stressing to provide against the entrapment of fluid between the tank wall and the cup 10 while the bladder is expanding during the discharge of the fluid from the accumulator. Accordingly, the invention contemplates the provision of means which, as an incident to such stretching of the cup 10, forms channels between the exterior of this cup and the interior of the tank, such channels extending toward the tank outlet 6 so as to permit trapped fluid to escape along the tank wall and pass the lips of the cups. Herein, this means comprises annularly spaced ribs or thickened portions 21 molded on the inside of the cup 10 and extending longitudinally of the latter from points adjacent the neck 14 to points near the lip 11.

Owing to their greater thickness, the sections 21 will resist stretching more than the thinner intervening portions of the cup 10. Thus, as the wall of this cup stretches during inflation of the bladder, the thickened parts 21 of the bladder shown in Fig. 1 straighten out and move away from the tank wall as shown in Fig. 3. In the case of the bladder shown in Fig. 4, the thinner areas expand against the tank while the thickened parts remain spaced therefrom. As a result, external meridian channels 22 are created temporarily opposite the thickened portions 21, and the liquid trapped in any pockets between the cup 10 and the tank wall collects in these channels and is permitted to flow therealong toward the outlet of the tank. If desired, knobs 23 may be molded or otherwise formed at annularly spaced points around the exterior of the cup lip 12, these serving to provide adjacent channels for the escape of oil from the channels 22 into the space between the cup 9 and the tank.

I claim as my invention:

1. An accumulator having, in combination, a spherical tank, and a similarly shaped bladder supported at one end by the tank so that the adjacent portion is stretched as an incident to full expansion of the bladder within the tank, said first mentioned portion only having alternate thick and thin areas annularly spaced and differently stretched during said expansion whereby to create meridian channels for the escape of fluid becoming trapped between the tank and said first mentioned portion.

2. An accumulator having, in combination, a spherical tank, and a similarly shaped bladder therein secured at one end to the tank with the adjacent semi-spherical portion fitting closely within one end of the tank to permit flexing of the remaining portion of the bladder into and out of said first portion, said first portion being thickened on the inner side thereof and along annularly spaced longitudinal lines to form annularly spaced thin wall areas separated by thickened areas which stretch to a lesser degree than said thin areas whereby to form external channels permitting the escape of any liquid trapped between said portion and the internal wall of the tank.

3. An accumulator having, in combination, a spherical tank, a bladder in said tank having a semi-spherical end portion which when deflated is substantially the same size as the interior of said tank, the other end portion of the bladder when deflated being somewhat shorter axially than the first portion, means securing said first mentioned end portion to said tank, and meridian ribs formed on the interior of said first mentioned spherical portion and operating during inflation of the bladder to create fluid escape channels disposed between the interior of the tank and the exterior of said first end portion.

4. An accumulator diaphragm comprising a flexible walled bag having a smooth external surface and adapted to be inflated by introducing air in one end, and annularly spaced meridian ribs formed on the interior of said bag and extending from said end substantially to the equator of the bag, the inner and outer wall surfaces of the remaining portion of the bag between said ribs being smooth.

5. An accumulator diaphragm comprising a flexible walled bag having a smooth external surface and adapted to be inflated by introducing air in one end, annularly spaced meridian ribs formed on the interior of said bag and extending from said end substantially to the equator of the bag, and projections on the exterior of said bag spaced around the equator thereof.

WELLS A. LIPPINCOTT.